United States Patent [19]

Schopper

[11] 4,198,662
[45] Apr. 15, 1980

[54] METHOD OF RECORDING AND PLAYING BACK VIDEO SIGNALS ON MAGNETIC TAPE

[75] Inventor: Heinrich-Christian Schopper, Krefeld, Fed. Rep. of Germany

[73] Assignee: Bayer Aktiengesellschaft, Leverkusen, Fed. Rep. of Germany

[21] Appl. No.: 862,089

[22] Filed: Dec. 19, 1977

[30] Foreign Application Priority Data

Dec. 23, 1976 [DE] Fed. Rep. of Germany ....... 2658574

[51] Int. Cl.$^2$ .............................................. H04N 5/78
[52] U.S. Cl. ........................................ 360/33; 360/23; 360/63
[58] Field of Search ................... 360/23, 9, 74, 63, 33, 360/32, 22

[56] References Cited

U.S. PATENT DOCUMENTS

| | | | |
|---|---|---|---|
| 2,952,745 | 9/1960 | Walker | 360/23 |
| 2,958,735 | 11/1960 | Maier | 360/23 |
| 3,502,795 | 3/1970 | Camras | 360/74 |
| 3,921,209 | 11/1975 | Yoshino | 360/23 |
| 3,958,272 | 5/1976 | Rotter | 360/74 |
| 3,975,764 | 8/1976 | Kobayashi | 360/23 |

*Primary Examiner*—Bernard Konick
*Assistant Examiner*—Alan Faber
*Attorney, Agent, or Firm*—Sprung, Felfe, Horn, Lynch & Kramer

[57] ABSTRACT

In order to record and play back video signals on magnetic tape, the magnetic tape is fed past a magnetic head and reversed periodically. A stationary multi-track magnetic head is used, and a magnetic tape moves relatively thereto. The head gaps of the multi-track head are successively allocated to the lines of a half-picture in accordance with circuit technology during forward travel. In this case, the half-picture is recorded by gapwise scanning in the form of very narrow short non-overlapping stepwise parallel tracks and is reproduced during playback. During backwards travel of the magnetic tape, the head gaps are then allocated to the lines of the half-picture in the reverse sequence so that the track sequence is shifted by at least one gap during each reversal. The gaps missing at the end of the track sequence are made up cyclically by the corresponding number of gaps at the other end of the row of head gaps.

20 Claims, 5 Drawing Figures

METHOD OF RECORDING AND PLAYING BACK VIDEO SIGNALS ON MAGNETIC TAPE

The invention relates to a method of recording and playing back video signals on magnetic tape, in which the magnetic tape is fed past a magnetic head and is reversed periodically.

Video recorders for recording moving pictures on magnetic tape may be divided into three types:
1. Studio apparatus;
2. Non-portable apparatus for semi-professional purposes; and
3. Domestic video recorders and portable recorders.

All the types of recorder which are at present commercially available operate with rotating head systems in order to ensure that the relative speed between the tape and head is sufficiently high (typically between 10 m/sec and 40 m/sec) to record coloured pictures having a frequency bandwidth of from 3 to 5 MHz.

Most studio machines operate on the quadruplex method, in which a head support with four magnetic heads rotates on a 2″ wide magnetic tape, almost perpendicularly to the running direction thereof, and in which picture information is recorded on tracks which are about 250 $\mu$m wide and about 48 mm long. These machines achieve a frequency bandwidth of up to 5.5 MHz for a coloured picture signal. The tapes are wound on very heavy unwieldy flanged spools and experienced skilled personnel are required to operate the very expensive machines.

More recently, "slant-track" or "helical-scan" recording methods have been used in studios. In these methods, the tape is fed obliquely past the rotating head wheel in the shape of an $\alpha$ or $\Omega$ winding so that the video tracks are inclined to a greater or lesser extent to the longitudinal direction of the tape, thus causing the feed rate of the tape (typically from 16 to 30 cm/sec) to determine the interval and the angle of the tracks. Smaller tape speeds and, when using narrower tapes (generally 1″), longer playing times may be obtained by this method. Until quite recently, the use of slant track methods in studios was accompanied by the problem of obtaining a sufficiently exact overlap during play back of the head gap and the video tracks, the length of which are about 80 mm, so as to make it possible to exchange a tape. This problem was solved by various electronic methods, for example automatic scan tracking.

The recorders of types 2 and 3 above all operate by the slant track method. Generally the tape drive, the tape and the electronic system are simplified, but recordings of colour signals which are from good to acceptable (frequency bandwidth of between 3 and 4.5 MHz) may nevertheless be obtained with an easily operated, reliable apparatus. In order to improve the tape guide and to simplify operation, the spools are frequently mounted in housings to form video cassettes which simply have to be introduced into a cassette chamber apparatus. The tape is threaded into the tape drive automatically. In top class apparatus the track stability is so exact that the tapes may be exchanged, whereas in most apparatus, it is necessary to tolerate greater losses in quality owing to faulty track stability during play back with other tape drives, even in machines, of the same model.

A method is known from the specialist literature of solving the problem of track overlap by recording the video signal parallel to the longitudinal direction ("LVR" or Longitudinal Video Recording). In order to reduce the amount of tape required in this method, the magnetic head is kept stationary during recording or play back (a combined recording and play back head being used) until a video track which is about 200 $\mu$m wide is recorded or scanned over the whole length of the tape. The direction of travel of the tape is then reversed by reversing the tape drive and the head is moved downwards mechanically, perpendicularly to the direction of travel of the tape by a distance sufficient to enable the next longitudinal track to be recorded, independently of the first track. In this way, it should be feasible to record 28 tracks for sound and picture on tapes which are 6.3 mm wide and up to 780 m long by continually reversing the tape and shifting the head. The tape speed is 3 m/sec, and the tapes are 6 $\mu$m thick. The playing time is 120 minutes.

The following requirements must be met in a compact and inexpensive domestic video recorder.
1. Economic feasibility: the price should be at least one order of magnitude below that of studio apparatus.
2. Capacity for recording full range of colours, ease of operation, sufficiently light weight to be portable.
3. Long playing time with inexpensive tape material.

The video recordings must be completely compatible as played audio tapes or audio cassettes. They should not be restricted to using the head system and tape drive with which recording was carried out to obtain perfect play back.
4. Luminance bandwidth at least 3 MHz, stereo tuning, at least half the horizontal resolution of studio apparatus, low head wear (running time: >1000 h), signal-to-noise ratio $\geq$40 dB peak-to-peak.

These requirements are only partially fulfilled by the commercially available domestic video recorders. The main falling in the systems in the medium and lower price ranges is that recorded tapes can only usually be played back on other apparatus of the same type with considerable loss in quality or not at all. Very little is known about the accuracy of the LVR-System but there are strong doubts as to whether an exact overlap of video track and head gap is feasible over tape lengths of several hundred meters with film thickness <10 $\mu$m and track widths $\leq$200 $\mu$m. Extreme requirements which are hardly technically practicable at present are imposed upon the precision of the vertical movement of the head as well as on the tape guide. Even the slightest local skewing of the tape results in a total breakdown of the picture.

The invention relates to a method of recording or play back using a periodically reversing magnetic tape. The object of the invention is to replace the described precision engineering for moving the head vertically by simpler means and at the same time to improve the accuracy of the track in comparison to the known systems. Since the invention is mainly directed at domestic video recorders, requirements 1 to 4 set out above must be fulfilled.

According to the invention, there is provided a video tape recorder comprising a stationary multitrack magnetic head or head stack having a row of head gaps, drive means for moving a magnetic tape past the head in a direction which is periodically reversed, and circuitry for allocating the said gaps to the lines of a half-picture successively during forwards tape travel and successively in reverse sequence during backwards tape travel, so that the half-frame is recorded or reproduced by gap-wise scanning the lines of the half-frame in the form of very narrow, short, superimposed tracks, the track sequence being shifted by at least one gap during each reversal and the gaps missing at the end of the track sequence being made up cyclically of the corresponding number of gaps at the other end of the row of head gaps.

The invention also provides a method of recording and playing back video signals on magnetic tape, in which the magnetic tape is fed past a magnetic head and reversed periodically, wherein a stationary multi-track head and a magnetic tape which moves relatively thereto are used, the head gaps of this multi-track head being allocated successively to the lines of a half-picture in accordance with circuit technology during forwards travel (track sequence) and the half-frame recorded or reproduced by gap-wise scanning the lines of the half-frame in the form of very narrow short superimposed tracks and the head gaps are allocated to the lines of a half-frame in reverse sequence when the magnetic tape travels backwards, wherein the track sequence is shifted by at least one gap during each reversal and in that the gaps missing at the end of the track sequence is made up cyclically by the corresponding number of gaps at the other end of the row of head gaps.

Thus after the ith reversing procedure, recording begins for the forward travel with the gap $K_v = 1 + z(i-1)$ and for the associated backwards travel with the gap $K_r = n - zi$, wherein z is the track shift ($z \geq 1$) and n is the number of head gaps. The track sequence is advantageously shifted by from 1 to 5 gaps during each reversal. The track width $S_B$ is advantageously between 20 and 200 μm. The value of track length $S_L$ divided by track width is advantageously below 100. $5 \leq S_L/S_B \leq 50$ is preferred.

In a preferred embodiment of the invention, the tracks are synchronized by desired numerical addressing of the starting gap according to the formulae given above.

Moreover, it has been found that play back may be improved if several additional adjacent gaps, preferably 1 or 2 gaps, above or beneath the recording gap are used during play back in addition to the actual recording gap. This enables the recorded track to be positively detected during play back. A possible track loss of short duration only causes one line or a few lines to fail and not as in conventional methods, a corresponding number of half-frames to fail.

The method according to the invention provide a new way or recording video signals. The information stored per unit of length is considerably higher than in the hitherto known methods. The magnetic tape is utilized substantially better in this way. The method is also superior to the conventional recording methods with regard to track accuracy. The expensive precision engineering required for the magnetic head in conventional apparatus is dispensed with. The electronic addressing of the track sequence as used in the method according to the invention may be produced relatively easily using presently commercially available electronic components. Relatively inexpensive, robust but nevertheless highly precise video recorders may be constructed according to the invention. For this reason, the invention is particularly well suited to domestic video recorders.

The invention is described in more detail below with reference to the accompanying drawings, in which FIG. 1 is a diagrammatic illustration of a multi-track head;

Figure 1:
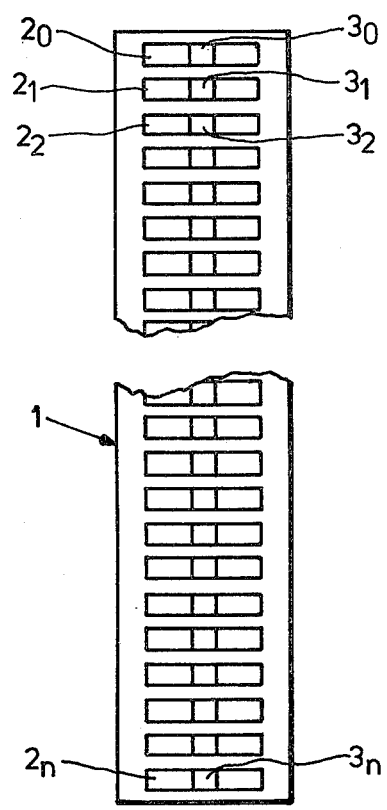

The method according to the invention uses a multi-track head 1, as shown diagrammatically in FIG. 1. Such multi-track heads can be produced economically using modern integrated technology methods. 312 video gaps and at least one cue track may be accommodated over a total width of 25.4 mm (1″). The multi-track head 1 may be constructed as a batch of individual heads $2_o$ to $2_n$ each having a respective gap $3_o$ to $3_n$, as shown in the drawing. It is important for the mechanical partition between the individual heads to be as thin as possible and for the heads to be well protected from each other magnetically. The recording properties of such integrated multi-track heads are described in the literature (c.f. for example J. P. Lazzari, AIP Conf. Proc. Volume 24, 1974 pages 990 to 1004).

It is not absolutely essential to use the high number of individual heads referred to above in the method according to the invention. The number may be reduced if larger tape lengths or shorter recording or play back times are accepted. An increase in the number of individual gaps $3_o$ to $3_n$ results in an inversely proportional reduction in the amount of tape required. However, it is desirable from the point of view of picture organisation for the number of video tracks to be an integral multiple of the number of lines required per half-picture 312 lines in the case of the PAL system and 262 in the case of the NTSC system.

The sound may be recorded stereophonically at the same time, superimposed on two video tracks as a low frequency amplitude or frequency modulation. In order to reduce the associated extra electronic complexity of the circuit, it is, however, more desirable to provide two additional tracks for transferring the sound to the head. The above-mentioned track head then requires a total of 314 gaps.

It is also possible to superimpose the audio signal on several adjacent video tracks and to separate it off by filters during play back. In this way, the signal-to-noise ratio of the sound play back is increased. Since the sound and picture may be accommodated in principle on the same track, only "video tracks" are mentioned below.

Figure 2A:
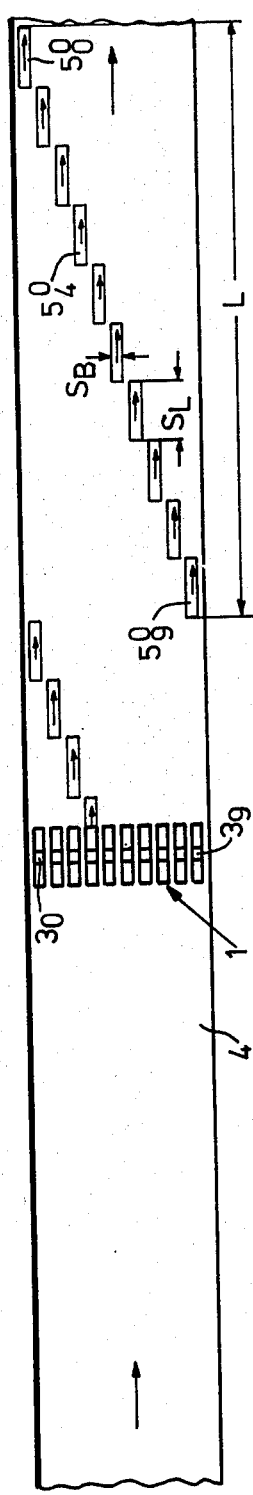
FIG. 2 shows the track sequence during recording for forwards travel (FIG. 2a) and backwards travel (FIG. 2b)

The recording method is accordingly illustrated in more detail with reference to FIG. 2. The multi-track head 1 is arranged adjacent the magnetic tape 4 with its axis perpendicular to the direction of travel of the tape. The total width of the multi-track head corresponds approximately to the width of the magnetic tape 4. For the sake of simplicity, a multi-track head with only ten individual heads and accordingly only 10 head gaps $3_0$ to $3_9$ is illustrated. Consequently, the recorded half-frame is only built up of 10 tracks. FIG. 2a represents the first passage of the magnetic tape from left to right (forward travel i=0). The first line of the first frame is recorded on the tape longitudinally by gap $3_0$ as a first video track $5_0^0$. Line 2 is subsequently recorded with gap $3_1$ which lies below gap $3_0$ and so on up to gap number $3_9$ on the lower tape edge. The last track $5_9^0$ of each half-picture is an additional cue track containing the digitally coded address of the head gap with which the recording of the next half-frame should begin. It serves to synchronize the sequence of gap and track electronically. Track length $S_L$ and track width $S_B$ are only shown in FIG. 2 qualitatively.

Figure 2B:
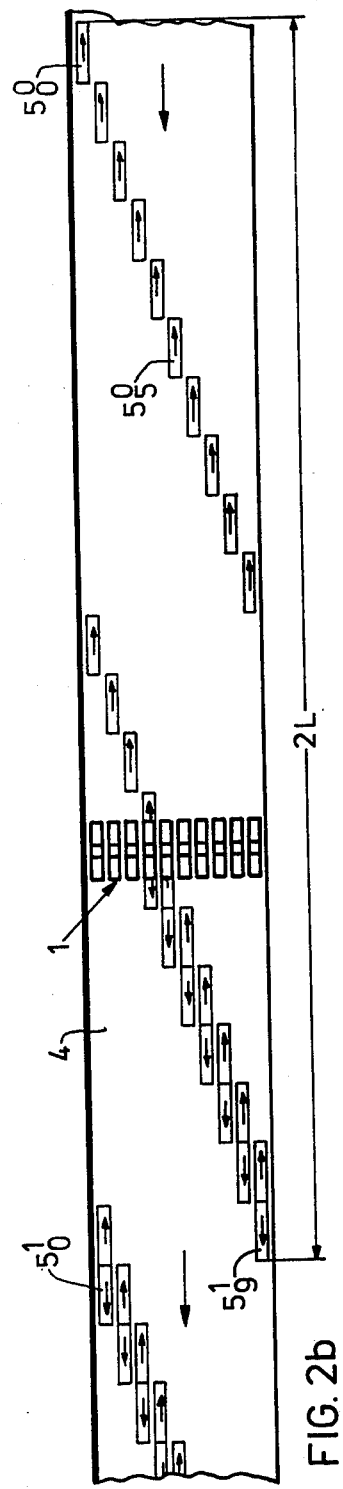

After recording the first half-frame, the second half-frame is recorded in a similar manner. The same procedure is used for the succeeding frames up to the end of the tape 4. The tape drive is then changed within a time interval $\Delta t \leq 40$ ms so that the tape travels in the reverse direction, in other words from left to right (first reversal see FIG. 2b). The track sequence for the first backward travel is shown in FIG. 2b. Recording is longitudinal again but is now from right to left and, in order to avoid a cross-over of the tracks, is carried out from bottom to top of the multi-track head 1. In order to distinguish from the picture sequence which was recorded from left to right, the track sequence must now be shifted by at least one gap, thus for example the recording may begin with gap $3_8$ and not with gap number $3_9$. During the first backward travel therefore the gaps $3_8, 3_7, 3_6, 3_5, 3_4, 3_3, 3_2, 3_1, 3_0, 3_9$ are activated one after the other. This is continued half-frame wise until the next tape reversal, i.e. the second forward travel from left to right. During this course, recording takes place starting with gap $3_1$ in the gap sequence $3_1, 3_2, 3_3, 3_4, 3_5, 3_6, 3_7, 3_8, 3_9$ and $3_0$. This progression may be continued for up to eight reversals.

To assist in understanding this, FIG. 2b shows the last video track $5_0^1$ of the first backward travel and the cue track $5_9^1$ of to the first half-frame and first reverse travel. The length of a half-frame is designated by L and that of the total picture by 2 L. Corresponding tracks of successive half-frame are provided with the same reference numerals.

As is described below with reference to the first embodiment, it is not however absolutely essential, provided the tape is sufficiently long, to place the tracks as close together as possible in the vertical direction. In order to improve the separation of the tracks, it is more desirable to reduce the number of reversals and to jump over several gaps 3 after each reversal, for example starting with gap $3_6$ instead of with gap $3_8$ during the first reversal in the example of FIG. 2, starting with gap $3_3$ instead of gap $3_1$ after the second reversal, and so forth. The track sequence is thereby shifted by two gaps in each case. If the track shift is designated generally by z and the total number of gaps by n, then the following address matrix is produced for addressing or activating the starting gap of the individual track sequences:

For the ith backwards travel (that is after the i th reversal) from right to left, the gap whose number is given by $$K_r = n - zi - 1 \tag{I}$$

should be selected, and from left to right, the gap with the number $$K_v = 1 + z(i-1) \tag{II}$$

With $Z \geq 1$ (for I and II) should be selected.

In practice, a track shift of $z \geq 4$ is sufficient. In this way, the tracks relating specific frame lines may always be separated from each other by at least four tracks widths (corresponding to about 210 μm) regardless of the total number of reversals carried out. This ensures adequate attenuation of cross-talk.

In the example of FIG. 2, the number of head gaps n is 10 and the track $z=1$.

the method described also has the advantage of allowing activation not only of the gap j but at least of the gap $j-1$ and $j+1$ as well during play back of the jth track without producing faults in the picture. Thus the track j is always detected in a scanning width even if local skewing of the tape occurs, the scanning width being equal to at least three times the gap width to cope with a local skew of 33° to the horizontal. For this reason, as well as for fundamental consideration arising from the optimum use of the storage surface of the tape, the interval between the individual heads of the multi-track head should be as small as possible.

The cyclic synchronous activation of the individual gaps 3 (that is the connection of the associated individual heads) according to equation I and equation II may be effected relatively easily electronically using suitable counter/gate circuits and/or micro-processors during recording or play back and is described with reference to FIGS. 3 and 4.

Figure 3:
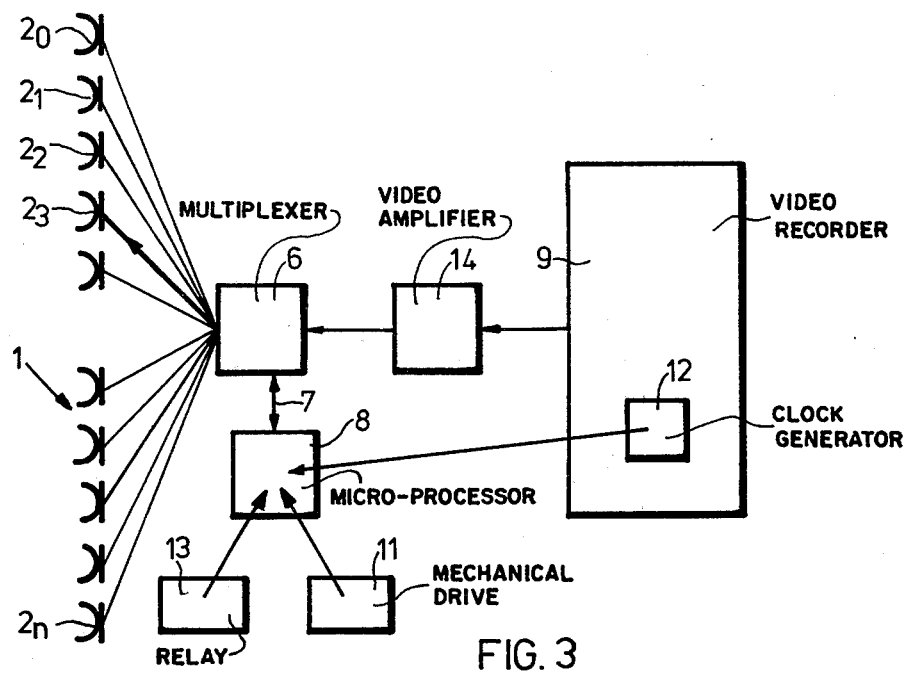
FIG. 3 is a block diagram showing the allocation of the individual gaps during recording.
Figure 4:
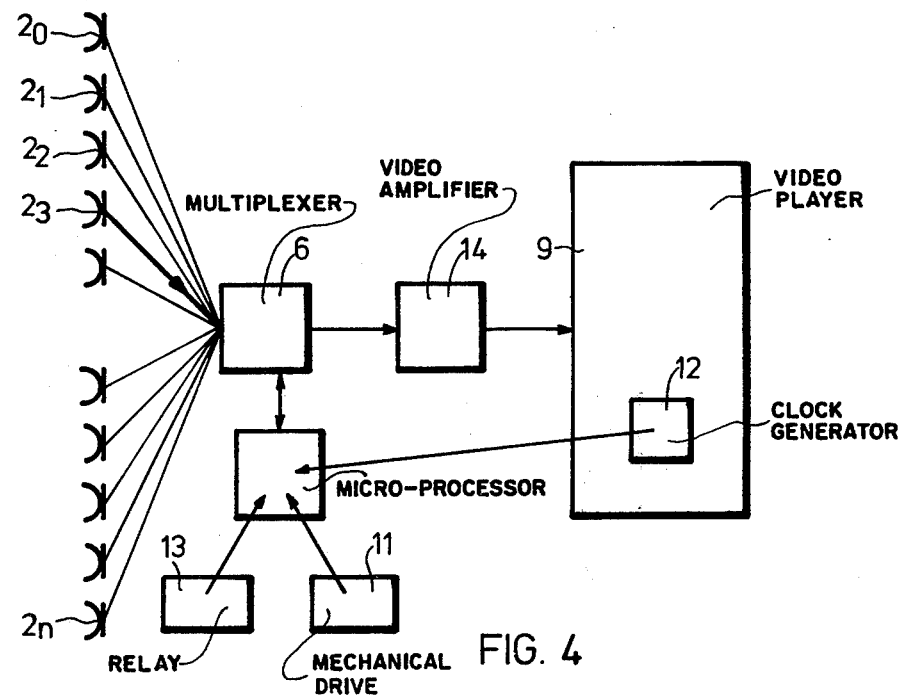
FIG. 4 is a block diagram showing the allocation of the gaps during play back.

FIG. 3 is a block diagram showing recording. The individual heads $2_0$ to $2_n$ of the multi-track head 1 are designated by the corresponding circuit symbols. The head gap $2_9$ for example, is reserved, for a cue track. When recording a track according to FIG. 2, only the head $2_3$ for example is active while all other heads are inactive. The outputs of the individual heads are connected to a multiplexer 6. The multiplexer 6 is controlled via a data bus 7 by a micro-processor 8. Video signals produced in a conventional video recording device 9 are fed to the multiplexer 6 via the video amplifier 14. The mechanical drive of the video recorder is designated by references numeral 11 and a clock generator integrated in the video device 9 is designated by reference numeral 12. The clock generator predetermines the time for the track sequence and is co-ordinated with the micro-processor 8 as is the drive 11. The drive feeds the magnetic tape 4 past the stationary multi-track head 1 and reverses after each passage. The assembly 13, for example a relay, merely informs the micro-processor 8 of the status of the video recorder (i.e. whether "record" or "play back"). The recording process will now be described in more detail with reference to the use of the multi-track head with ten individual heads shown in FIG. 2. The micro-processor 8 determines the operation of the multiplexer 6 to cause it to be connected through to head $K_v^0 = 2_0$ and activate the latter for recording. The address of the starting gap is stored. Synchronization is then carried out by the clock generator 12, and a connection is made through to the head $2_1$ and the second line is recorded. Connections are similarly made to the other heads until the last line is recorded by head $2_8$. The number of the starting gap is then recorded on the cue track $5_9^0$. The same routine is followed for the subsequent half-frames until the end of the tape is reached. When the drive is reversed (first backwards travel $i=1$) the micro-processor 8 receives a pulse from the drive 11 and is programmed to jump to the address $K_r^1 = 8$. A connection is made through to the head $2_8$ in the multiplexer 6 and this head is activated as the starting gap. 0 is overwritten by 8 in the memory. Heads $2_7, 2_6, 2_5, \ldots$ head $2_0$ are successively connected through. Thus, 9 video tracks (characterised by an arrow from right to left in FIG. 2) are recorded. The address of the starting gap $K_r^1 = 8$ is recorded on track $5_9^1$. This is repeated for each half-frame in the same way to the end of the tape. The tracks distinguished by an arrow from right to left in FIG. 2b are formed. During the next reversal of the drive 11 for the second forwards travel, the micro-processor 8 receives another pulse so that it is programmed to jump to the address $K_{v1} = 1$ and activates head number $2_1$ as the starting gap. The microprocessor 8 then runs through the addresses 2, 3, 4 ... 9 and thus activates the head gaps $2_2$ to $2_9$ in the sequence prescribed by the clock generator 12 and records tracks $5_1^1$ to $5_9^1$. Track $5_0^1$ is now the cue track and contains the number of the starting gap. There is now a zero in the memory. This is repeated for each half-frame until the next reversal. In order to simplify programming of the micro-processor 8, it is desirable for the pulses to be different from left to right and right to left during rearrangement of the drive. If the micro-processor 8 receives a pulse of type 1 (forwards travel) it forms $K_v = 1 + z \cdot (i-1)$ as the starting address and counts at the rate determined by the clock generator 12 through the addresses $K_v$, $K_{v+1}$, $K_{v+2}$ ... $K_{v+8}$ to record the video tracks and places the starting gap address on track $K_{v-1}$. If the micro-processor 8 receives a pulse of type 2, that is backward travel (from right to left) then it calculates the starting gap address $K_r = n - zi$ and counts back 8 positions in time, i.e. $K_r$, $K_{r-1}$ ... $K_{r-8}$ and places the starting gap address on the track $K_{r+1}$. $K_{r-1}$ is replaced by $K_{r+1}$ in the memory. $K_v$ or $K_r$ are calculated according to equations II of I respectively for a predetermined track shift z as a function of the number of reversals i, as programmed by the microprocessor.

For play back (FIG. 4) the status of the recorder 9 is changed from recording to play back. The microprocessor receives an additional pulse from the relay 13 and is placed at the starting address zero, causes the multiplexer 6 to connect the heads $2_0$ to $2_8$ successively to the video amplifier 14 to effect play back of the lines, and deduces from track $5_9^0$ the address of the next starting gap. This is maintained until the first reversal. The number of the next starting gap is then generated in the micro-processor by a pulse from the drive 11 and the scanning takes place synchronously for recording in the reverse direction of travel. A true play back of the pictures recorded on the track takes place in this manner.

The drive 11 maybe similar in construction to the drive used in the known LVR method. No other mechanical devices are required apart from the tape feed and the reversal.

EXAMPLE 312 video tracks, 2 sound tracks 1 synchronization track of width B, as well as 314 separating tracks of width $\Delta = B/2$ are to be accommodated on a tape of width of 25.4 mm $\triangleq 1''$. Thus, B = 53 $\mu$m and $\Delta = 26.5$ $\mu$m.

Using longitudinal tape travel solution of a type suitable for use in commercial domestic video recorders, the track length is 240 $\mu$m. The ratio of track length (240 $\mu$m) to track width (B = 53 $\mu$m) is <4.6:1. In contrast, this ratio is 350:1 to 400:1 in continuous slant track techniques.

The length of a picture is $2 \times 312 \times 240$ $\mu$m = 15 cm.

A tape speed of 3.75 m/sec is therefore needed for PAL (25 repetitions of picture per sec.) and a tape speed of 4.5 m/sec. for NTSC.

The corresponding tape lengths for one hour of playing time without reversals are then L = 13500 m for PAL and L = 16200 m for NTSC.

For recording, a tape of 18 $\mu$m thickness ($\triangleq$ triple tape or cassette C-60) and a maximum length of 360 m (spool diameter 11 cm) is to be used. In this case, reversal would have to take place L/360 times for a playing time of two hours (360 m tape). This gives the following values:

Playing time 1 hour; tape length 180 m; number of reversals 75 for PAL, that is once every 48 seconds, 90 for NTSC, that is once every 40 seconds.

Playing time 2 hours; tape length 360 m; number of reversals 75 for PAL, that is once every 96 seconds, 90 for NTSC, that is once every 80 seconds; condition for rearrangement time:

<1/12 sec for PAL
<1/30 sec for NTSC

In contrast to the LVR system known from the literature, an established mechanically stable type of tape with a 12 $\mu$m thick foil may thus be used. This tape is definitely substantially less sensitive to plastic deformations, ripple or buckling than the extremely thin tapes with foil thicknesses of 4 $\mu$m, of the type hitherto used with the LVR System. Thus, the tape provides more favourable conditions for a uniform layer of track as well as overlap of the video track and the head gap.

What we claim is:

1. A video tape recorder comprising a stationary multi-track magnetic head having a row of head gaps, drive means for moving a magnetic tape past the head in a direction which is periodically reversed, and means for allocating the gaps to the lines of a half-frame successively during forward tape travel, to record or reproduce the half-frame by gap-wise scanning the lines of the half-frame in the form of very narrow, short, non-overlapping stepwise parallel tracks, and for shifting the track sequence by at least one gap during each reversal and the gaps missing at the end of the track sequence being made up cyclically of the corresponding number of gaps at the other end of the row of head gaps.

2. A recorder according to claim 1, wherein recording for the forwards travel is begun at the gap $K_v = 1 + z (i-1)$ and for the associated backward travel at gap $K_r = n - zi$ after the ith reversal, wherein z designates the track shift ($z \geq 1$).

3. A recorder according to claim 2, wherein that the track shift z is in the range defined by $1 \leq z \leq 5$.

4. A recorder according to claim 1, wherein the track width $S_B$ is in the range defined by 20 $\mu m \leq S_B \leq 200$ $\mu$m.

5. A recorder according to claim 4, wherein the track width is not more than 100 $\mu$m.

6. A recorder according to claim 4, wherein the ratio of track length to track width is not more than 100:1.

7. A recorder according to claim 6, wherein the said ratio is between 5:1 and 50:1.

8. A recorder according to claim 1, further comprising means for the synchronization of the tracks by desired numerical addressing of the starting gap.

9. A recorder according to claim 1, wherein in use a plurality of extra adjacent gaps are used for playback in addition to the actual recording gap to improve track following.

10. A recorder according to claim 9, wherein the said extra gaps are provided by one or two gaps above and/or below the recording gap.

11. A method of recording and playing back video signals on magnetic tape, in which the magnetic tape is fed past a magnetic head and reversed periodically comprising: providing a stationary multi-track head and a magnetic tape which moves relatively thereto in a forward and reverse direction, successively allocating the head gaps of this multi-track head to the lines of a half-frame during forward and reverse travel to record or reproduce the half-frame by gap-wise scanning the lines of the half-frame in the form of very narrow short non-overlapping stepwise parallel tracks and shifting the track sequence by at least one gap during each reversal to effect that the gaps missing at the end of the track sequence are made up cyclically by the corresponding number of gaps at the other end of the row of head gaps.

12. A method according to claim 11 further comprising beginning the recording for the forward travel at the gap $K_v = 1 + z(i-1)$ and for the associated reverse travel at gap $K_r = n - zi$ after the ith reversal, wherein z designates the track shift ($z \geq 1$).

13. A method according to claim 12, wherein the track shift z is in the range defined by $1 \leq z \leq 5$.

14. A method according to claim 11, wherein the track width $S_B$ is in the range defined by $20 \mu m \leq S_B \leq 200$.

15. A method according to claim 14, wherein the track width is not more than 100 $\mu m$.

16. A method according to claim 14, wherein the ratio of track length to track width is not more than 100:1.

17. A method according to claim 16, wherein the ratio is between 5:1 and 50:1.

18. A method according to claim 11, further comprising synchronising the tracks by desired numerical addressing of the starting gap.

19. A method according to claim 11, further comprising providing a plurality of extra adjacent gaps, are used for playback in addition to the actual recording gap, thereby to improve track following.

20. A method according to claim 19, wherein the extra gaps are provided by one or two gaps above and/or below the recording gap.

* * * * *

UNITED STATES PATENT AND TRADEMARK OFFICE
CERTIFICATE OF CORRECTION

PATENT NO. : 4,198,662
DATED : April 15, 1980
INVENTOR(S) : Heinrich-Christian Schopper It is certified that error appears in the above-identified patent and that said Letters Patent are hereby corrected as shown below:

In Col. 3, line 29; Col, 7, line 21; Col. 8, line 38-39; and Col. 9, 13th line, delete "$K_r$=n-zi" and insert --$K_r$=n-zi-1--.

Signed and Sealed this

Ninth Day of June 1981

[SEAL]

Attest:

RENE D. TEGTMEYER

Attesting Officer     Acting Commissioner of Patents and Trademarks